United States Patent [19]

Bader

[11] 4,428,391
[45] Jan. 31, 1984

[54] CIRCUIT FOR PNEUMATIC CONTROLLERS

[75] Inventor: Horst Bader, Filderstadt, Fed. Rep. of Germany

[73] Assignee: Eckardt AG, Stuttgart, Fed. Rep. of Germany

[21] Appl. No.: 265,704

[22] Filed: May 21, 1981

[30] Foreign Application Priority Data

May 21, 1980 [DE] Fed. Rep. of Germany ....... 3019360

[51] Int. Cl.³ ............................................. G05D 16/00
[52] U.S. Cl. ...................................... 137/84; 137/86
[58] Field of Search ........................ 137/86, 85, 84, 82

[56] References Cited

U.S. PATENT DOCUMENTS 2,712,321 7/1955 Grogan .................................. 137/86
3,782,403 1/1974 Bader .................................... 137/86

Primary Examiner—Alan Cohan
Attorney, Agent, or Firm—Craig & Burns

[57] ABSTRACT

A circuit for pneumatic controllers, a proportional-action range of which is adjustable, with the circuit including at least one differential amplifier having input pressure chambers being exposed to pressures derived between two throttle resistors respectively inserted in the measured value X input line and the desired value W-input line. All of the resistors are constant and a connecting line is interposed between connecting sections of the resistors, with the connecting line being provided with an adjustable throttle resistor.

6 Claims, 5 Drawing Figures

CIRCUIT FOR PNEUMATIC CONTROLLERS

The present invention relates to a circuit arrangement and, more particularly, to a circuit for pneumatic controllers having an adjustable proportional action or proportionality range, with the controllers including at least one differential amplifier having input pressure chambers which are adapted to be exposed to pressures derived between two resistors respectively inserted in a measured-value-x-input line and a desired-value-w-input line.

A controller of the aforementioned type is proposed in, for example, German Auslegeschrift No. 1,801,240 wherein a circuit for a PID controller is based upon a realization that the comparison points in control circuits, i.e., the processing of the signals, may be put into practice with simple structural components if the task is thought of as being a two-fold addition of respectively two of the four signals and one subtraction, with the comparison point being incorporated into the amplifier. In other words, the subtraction point need no longer be embodied in mechanical component outside of the amplifier. The addition step may be accomplished with the aid of two resistors without any considerable expenses by applying to these resistors, which form a pressure distributor, the addends in the form of pneumatic pressures. A signal is then obtained between these resistors which is proportional to a sum of the two applied pressures. The P-range adjustment is attainable in these proposed controller circuits by varying the resistance value of one or several of the throttle type resistors or restrictors. If the two resistors of a bridge, which resistors are connected to the input signals X and W, are adjusted together and in the same sense, then the output signal Y is proportional to the difference of X−W. In this connection, it is of importance that both resistors exhibit the same resistance value.

In order to reset the two resistors after their adjustment to the same resistance value, the two throttle resistors must be connected by a gear or transmission system or the like in order to be able to provide an identical adjustment range of the resistance values. This may be carried out by way of a gear system or the like which connects the two throttle resistors with each other.

A disadvantage of the provision of a gear or transmission system resides in the fact that considerable room is required for connecting the two throttle resistors by the gear or transmission system and, in spite of the direct connection, a possibly prevailing play in the throttle resistors may impair an exact setting of the resistors during a changing in a direction of rotation. Additionally, in such type of construction, pressure tightness must be provided in the rotary bore which, although possibly attainable through the use of O-rings, nevertheless involves, in total, a relatively large and expensive amount of material.

The aim underlying the present invention essentially resides in reducing the required amount of material and space necessary for realizing a pneumatic control arrangement with an adjustable proportional-action range.

In accordance with advantageous features of the present invention, all the resistors in the circuit for the pneumatic controller are constant and a connecting line is interposed between the connecting sections of the resistors, with the line being provided with an adjustable resistor or rheostat. As a result of this proposed arrangement, it is no longer necessary to adjust several resistors for setting the proportional action range but rather the proportional action range setting may be effected only at one point, namely, at the adjustable resistor arranged between the connecting lines of the individual resistors, with the setting being accomplished by simply turning one resistor.

By virtue of the above-noted features of the present invention, additional and expensive rotatable or turnable throttle resistors may be dispensed with. Moreover, a difference between the measured value and desired value (X−W) is no longer impaired in the circuit construction of the present invention by the properties of the adjustable resistors. Consequently, an amplification factor $K_p$ may also be realized in a calculatable fashion by the variable resistor in the pneumatic circuit.

In accordance with the present invention, a pneumatic circuit is provided having three pairs of throttle resistors with the respective pairs being of identical resistance value. An adjustable throttle resistor is connected between the first and second resistor pairs and an amplifier is connected between the second and third resistor pairs. The resistor pair lying in the middle exhibits a throttle resistance value which is relatively low as compared with the externally located resistor pairs. By virtue of a circuit constructed in such a manner, as it is used in particular for controllers with P-controller properties, the maximum amplification factor $K_p$ is predetermined by a ratio of the resistance value of the externally disposed resistors and may be varied by the adjustable resistor within the thus predetermined range. With the construction of the present invention, minimum amplification is obtained if the throttle is opened and maximum amplification is obtained if the throttle is closed.

In accordance with further advantageous features of the present invention, an pneumatic circuit is provided which includes three pairs of throttle resistors with each of the respective pairs having identical resistance values and with the amplifier being connected between the first and second resistor pair and the adjustable throttle resistor being provided between the second and third resistor pairs. The maximum amplification factor $K_p$ is again determined by a ratio of the resistance values of the two externally disposed resistor pairs and is reached when the throttle is opened, with the minimum amplification factor then being obtained when the throttle is closed.

Advantageously, in accordance with further features of the present invention, a circuit for pneumatic controllers with PI characteristic is proposed wherein two resistor pairs having pair wise the same resistance value, are provided with an amplifier as well as an adjustable resistor being connected mutually in parallel between the first and second resistor pairs. As a result of such arrangement, a feedback branched off from the correcting value Y, to an extent adjustable by means of the adjustable resistor, can be added to the measured value X and fed to the amplifier. Since the values for the feed back variable can be calculated with a delay member arranged in the feedback line, and the amplification ratio can be computed from a knowledge of the fixed resistors, such circuit realizes a controller formula or equation for a PI controller in a precalculable manner.

In accordance with the present invention, the input pressure chambers of the differential amplifier s are defined by elastic walls, which may be easily realized in pneumatic controller by utilization of diaphragm-controlled differential pressure amplifiers, the input pressure chambers of which are sealed off and the output signal which is fed from an auxiliary energy source. An advantage of this construction resides in the fact that the amplifier then acts as an energized de-coupler between the input and output signals of the controller, since the amplifier does not take any energy in the form of pressurized or compressed air from the two pressure distributors.

Advantageously, in accordance with the present invention, the resistors may be in the form of glass capillaries. Such a construction has the advantage that the resistance value of such resistors is very accurately known, since the glass capillaries with simultaneous measurement may be cut to a length corresponding to the resistance value. Additionally, the use of such type resistors are also very inexpensive from the manufacturing point of view. In this manner, precalculated control circuits can be realized exactly in a simple and very inexpensive fashion.

Accordingly, it is an object of the present invention to provide a circuit for pneumatic controllers which avoids, by simple means, shortcomings and disadvantages encountered in the prior art.

Another object of the present invention resides in providing a circuit for pneumatic controllers which dispenses with the need for providing a plurality of adjustable throttle type resistors.

Yet another object of the present invention resides in providing a circuit for pneumatic controllers which functions reliably under all operating conditions.

These and other objects, features, and advantages of the present invention will become more apparent from the following description when taken in connection with the accompanying drawings which show, for the purposes of illustration only, several embodiments of the present invention, and wherein.

Figure 1:
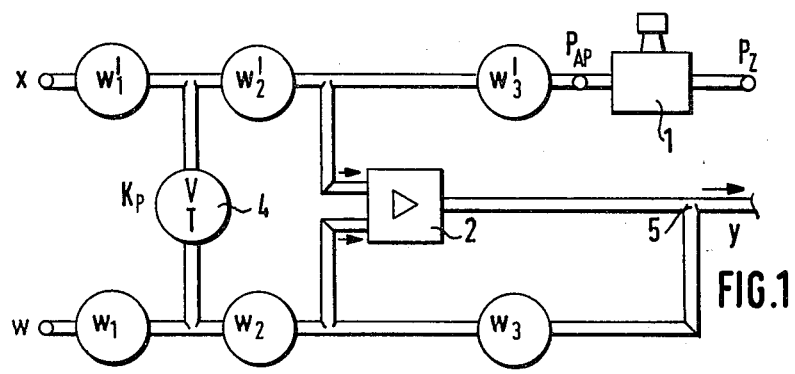
FIG. 1 is a partially schematic view of a circuit diagram for a P-type controller constructed in accordance with the present invention.

Referring now to the drawings wherein like reference numerals are used throughout the various views to designate like parts and, more particularly, to FIG. 1, according to this figure, a circuit for a P-controller is provided wherein a pressure medium such as compressed air is fed from the source (not shown) through a conduit $P_z$ to a manually controlled pressure generator 1 of conventional construction. An operating point $P_{AP}$ of the controller may be adjusted with the manually controlled pressure generator 1. Three resistors $W'_1$, $W'_2$ and $W''_2$ are connected in series between the input line to the measured value X and the output of the manually controlled pressure generator 1. Three additional resistors $W_1$, $W_2$, and $W_3$ are connected in series between a tap 5 at a line of a correcting value Y and the input line of the desired value D. The resistance values for the various resistors are as follows:

$$W_1 = W_1'; \; W_2 = W_2'; \text{ and } W_3 = W_3'.$$

In order to obtain pairwise identity of the individual resistors in an extremely inexpensive and simple manner, the respective resistors may be formed by using glass capillaries. An adjustable throttle resistor 4 is connected between the resistors $W_1'$, $W_2'$ and $W_1$, $W_2$. An amplifier 2, constructed as a differential pressure amplifier, is connected between the resistors $W_2'$, $W_3'$ and $W_2$, $W_3$. The resistance values for the resistors $W_2$, $W_2'$ are selected so that they are small in comparison with the resistance values for resistors $W_1'$, $W_2$ and $W_3'$, $W_3$.

If the adjustable throttle resistor 4 is closed, a full difference $(x-w)$ is applied to the inputs of the amplifier 2, there being added to the desired value W also the pressure downstream of the resistor $W_3$, branched off from the correcting value Y, and there being added to the measured value X, the pressure produced downstream of the resistor $W_3'$ from the manually controlled pressure generator 1, i.e., the full difference $(x-w)$ is amplified to the extent of the mutual relationship between the resistors $W_1-W_3$, since the resistors $W_2$ and $W_2'$ are selected to be small with respect thereto. If the adjustable throttle resistor 4 is opened, compensation occurs between the difference $(x-w)$ to an extent of the opening, i.e., the difference is reduced. Thereby, the differential pressures applied to the amplifier no longer differs greatly as with the adjustable throttle resistor 4 being closed. The minimum amplification $K_p$ is thus obtained in this case with the adjustable throttle resistor 4 being open.

Since the resistors $W_1-W_3$ and $W_1-W_3'$ utilized in the circuit of the present invention can be produced very cheaply and also can be accommodated in the controller in a space saving fashion, such a circuit opens up the possibility of manufacturing a controller with adjustable proportional action range in an inexpensive and compact construction while yet realizing thereby the controller equation or formula since the value of the pairs of resistors can be determined with extremely great accuracy, the operating point $P_{AP}$ is likewise exactly setable, and the characteristic of the amplifier 2 is determinable.

Figure 2:
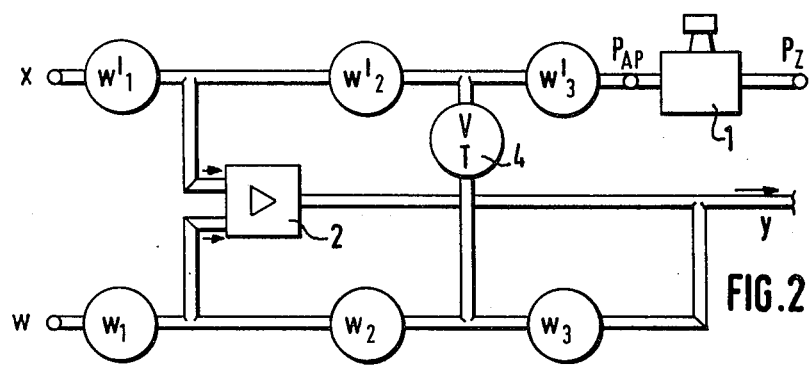
FIG. 2 is a schematic circuit diagram of another embodiment of a circuit constructed in accordance with the present invention for a P-controller.

FIG. 2 provides an example for arranging circuit elements for a P-controller, with the disposition of the amplifier 2 and the adjustable or variable throttle resistor 4 being interchanged as compared with the circuit arrangement of FIG. 1. If, in the circuit of FIG. 2, the adjustable throttle resistor 4 is opened, then the pressures to be added to the X- and W-values downstream of the resistors $W_2'$ and $W_2$ exhibit a lesser pressure difference then would be the case with the adjustable throttle resistor 4 being closed and, consequently, the difference $(x-w)$ together with the pressures downstream of the resistors $W_2$ and $W_2'$ remains at a maximum, that is, it is maximally amplified. In this construction, with the adjustable throttle resistor 4 being closed, the minimum amplification factor can be calculated and thus the control equation can be realized in an extremely simple manner.

Figure 3:
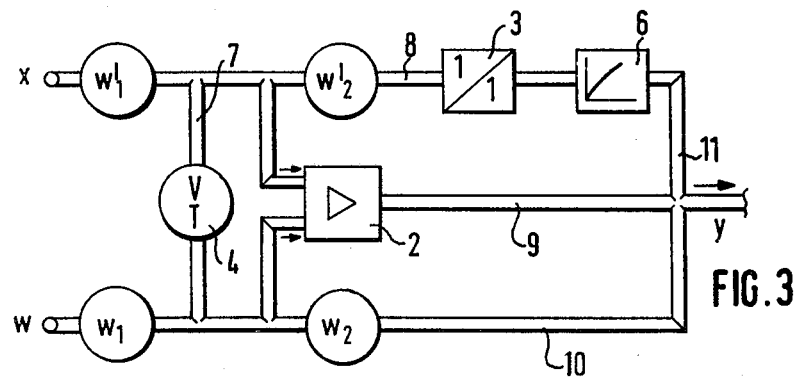
FIG. 3 is a schematic circuit diagram for another embodiment of a circuit constructed in accordance with the present invention for a PI controller.

FIG. 3 provides an example of a circuit arrangement for a PI controller in accordance with the present invention, wherein integral characteristic is produced by feedback from the correcting value Y by way of a delay member 6 and a 1:1 amplifier in a conventional manner.

Two pairs of resistors $W_1$, $W_1'$ and $W_2$, $W_2'$ are arranged in such a manner that the adjustable or variable throttle resistor 4 and the amplifier 2 may be disposed therebetween in a parallel connection, wherein the resistor $W_1'$ is located between the input of the measured value X and an input of adjustable throttle resistor 4, and the resistor $W_1$ is arranged between the input of the desired value W and the other input of the adjustable throttle resistor 4, with respectively identical resistance value.

As shown in FIG. 3, the resistor $W_2'$ is disposed between the 1:1 amplifier 3 and the input pressure chamber of the amplifier 2, to which is applied a sum from measured value and integral proportion. The resistor $W_2'$ has the same value as the resistor $W_2$ located between the correcting value Y and the input of the amplifier 2, on which acts the sum of the desired value W and the pressure ambient downstream of the resistor $W_2$. In this arrangement, it is possible to adjust, by means of the adjustable or variable throttle resistor 4, the proportion which, from the sum of the integral proportion and the measured value X, is to be applied to the input pressure chamber of the amplifier 2, exposed to the desired value W and the feedback value downstream of the resistor $W_2$. Since an integral time of a delay member can be readily determined and a difference of the values X and W can easily be calculated by using well known resistors $W_1$, $W_1'$ as well as $W_2$, $W_2'$, and the adjustable throttle resistor 4, it is ensured that the value for the correcting variable Y can be realiably realized by means of an inexpensive and compact circuit structure such as shown in FIG. 3.

Figure 4:
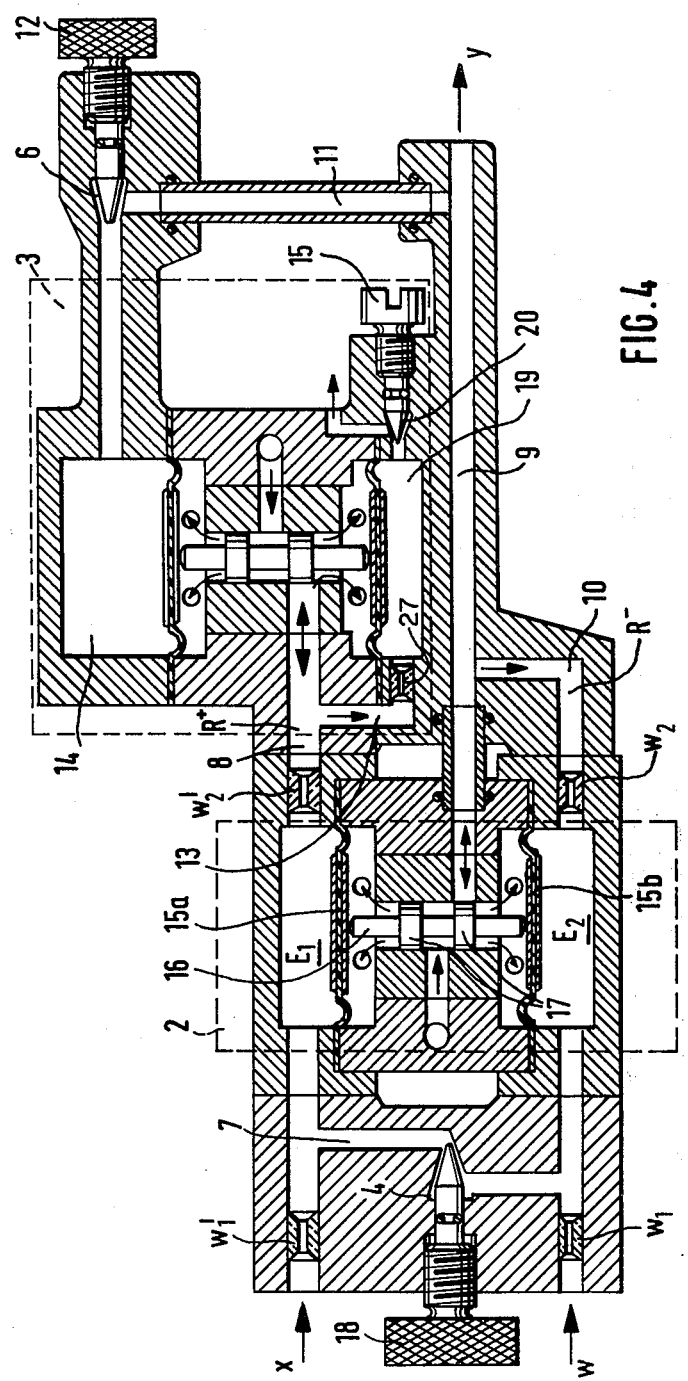
FIG. 4 is a cross sectional view of a PI controller station connected in accordance with the present invention.

FIG. 4 provides an example of a construction of a PI controller corresponding to the block circuit diagram of FIG. 3 with the difference residing in the fact that the amplifier 3 is capable of operating not only as a 1:1 amplifier but may also have amplification factors varied in a manner described more fully hereinbelow.

As shown in FIG. 4, the PI controller is conventionally combined into one module and includes a conventional differential pressure amplifier 2 which includes two elastic walls 15a, 15b defining on one side two input pressure chambers $E_1$, $E_2$. The elastic walls 15a, 15b are in operative connection with each other in that they both act on a spindle 16 carrying two circular sealing surfaces 17 which, in turn, admit input air pressure $P_Z$ to a duct 9 to a greater or lesser extent depending upon the position of the spindle 16. The input pressure chamber $E_1$ is connected between the resistor $W_1'$ and the resistor $W_2'$ and, anaglously, the input pressure chamber $E_2$ is connected between the resistors $W_1$ and $W_2$, wherein the resistance values of the resistor pairs $W_1$, $W_1'$ and $W_2$, $W_2'$ each have the same magnitude.

In accordance with the invention, a connecting duct 7 is arranged between the first resistor pair $W_1$, $W_1'$ and the second resistor pair $W_2$, $W_2'$, with the variable or adjustable resistor throttle being disposed in the connecting duct 7. As shown in FIG. 4, the variable or adjustable resistor throttle 4 may be constructed as a needle valve. By adjusting or rotating the screw 18, the connecting duct 7 is uncovered to a greater of lesser extent for the compressed air to pass therethrough so thereby the differential pressure between the input pressure chambers $E_1$ and $E_2$ can be set to be variable with only a single adjustable or variable throttle resistor 4. Thus, the throttle resistor 4 serves for setting the amplification factor $K_p$ of the pneumatic PI controller.

Depending upon the differential pressure between the pressure chambers $E_1$ and $E_2$, the spindle 16 permits a fed of compressed air from a source (not shown) into the duct 9, with the correcting value Y being derived at the outlet end of the duct 9. A duct 10 is branched off from the duct 9 for forming a feedback variable $R^-$, with the duct 10 terminating, through the resistor $W_2$, in the input pressure chamber $E_2$ for the desired value W.

To form an integral characteristic, a pressure value obtained proportionally to the correcting value Y is likewise transmitted from the duct 9 through a feedback duct 11 by way of a timing member to a separating amplifier 3. The timing member may be formed by means of a needle valve 6 variably adjustable by means of a nut 12 and a pressure chamber 14 of the separating amplifier 3. The separating amplifier 3 is constructed anaglously to the differential amplifier 2 and includes a pressure chamber 19. The pressure chamber 19 is fed with a pressure value proportional to a feedback variable $R^+$ through the conduit 13 with the duct 8, which duct 8 feeds the feedback variable $R^+$ through the resistor $W_2'$ to the input pressure chamber $E_1$ of the differential amplifier 2. In this manner, the separating amplifier 3 is connected in a negative feedback mode, with a degree of the negative feedback being variably adjustable by way of an adjustable needle valve 20 the position of which is controlled by a nut or slot headed portion 15 thereof. Consequently, a difference of the feedback variables $R^+$ and $R^-$ can be set in such a manner that the control deviation can be balanced with a specific setting of the amplification factor $K_p$. The resistors $W_1'$, $W_2'$ and $W_1$, $W_2$ may be constructed as glass capillaries so as to enable the insertion of the respective resistors into the appropriate ducts in an extremely simple manner.

Figure 5:
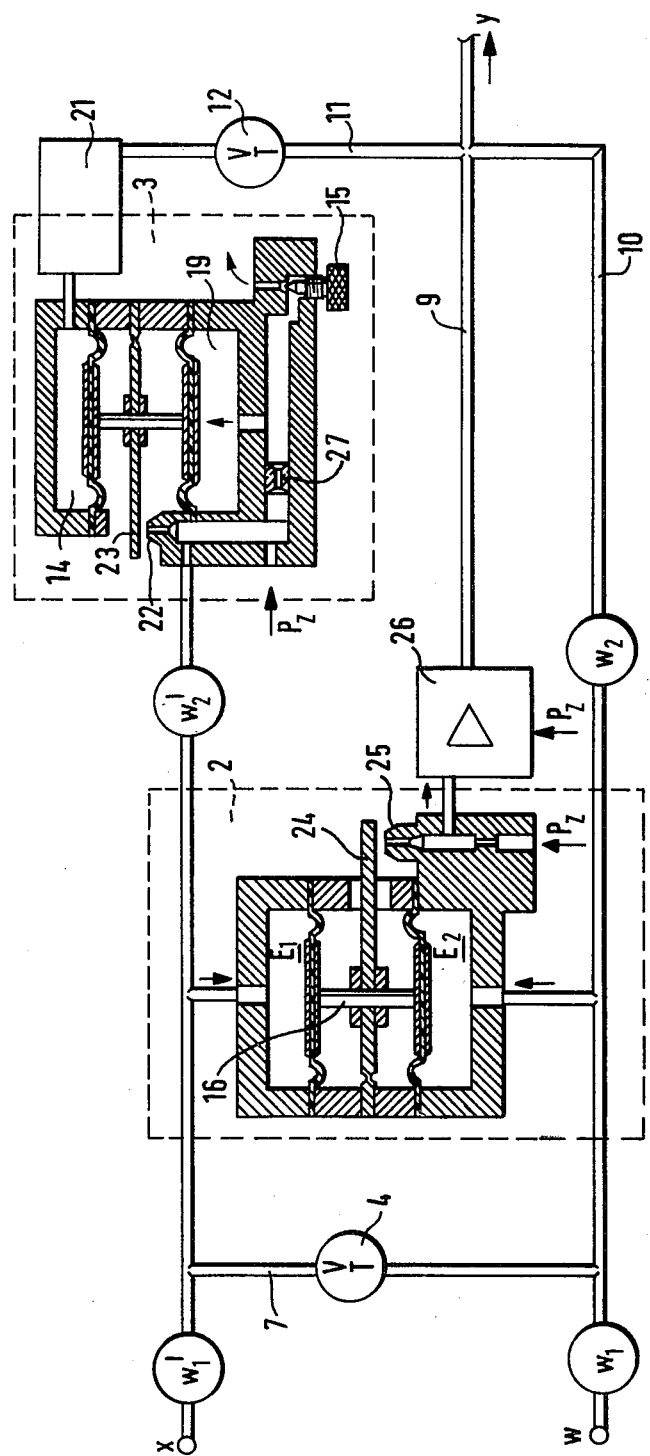
FIG. 5 is a partially schematic cross sectional view of another embodiment of a PI controller station constructed in accordance with the present invention.

As shown in FIG. 5, it is also possible in accordance with the present invention to employ, as the differential and separating amplifiers, amplifier elements which operate with the aid of a nozzle baffle system. More particularly, as shown in FIG. 5, a PI controller essentially corresponds to the controller of FIG. 4 with the difference being that a baffle plate 24 is affixed to the spindle 16 of the differential pressure amplifier 2, with the baffle plate 24 cooperating with a nozzle 25. The nozzle 25 is exposed to an air feed pressure $P_Z$. Depending upon the spacing of the baffle plate 24 from the nozzle 25, a corresponding air pressure value is transmitted to the energy or power amplifier 26 which introduces the correcting value Y into the duct 9. The separating amplifier 3 is of an analogous construction where a baffle plate 23 cooperates with a nozzle 22. A degree of negative feedback in the pressure chamber 19 is adjustable by way of the needle valve 15. The feedback-pressure to the negative feedback chamber 19 is taken from the pressure divider formed by throttle 27 and 15. A volume 21 and the needle valve 12 forms the timing member. In all the embodiment described hereinabove, the constant resistors $W_1$, $W_1'$, $W_2$, $W_2'$, $W_3$, $W_3'$, may be formed, in a very simple manner, out of glass capillaries which can be inexpensively produced and can be accomodated in the circuits with a minimum amount of space.

Additionally, only one adjustable or variable throttle resistor 4 is required in all three embodiments for realizing the respective controller properties such as P controller characteristics or PI controller characteristics.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A circuit for pneumatic controllers, the circuit comprising a measured-value input line means, a desired-value input line means, at least one differential amplifier means having input pressure chambers adapted to be exposed to pressures in the respective measured-value and desired-value input line means, a line means being provided for connecting the input line means to each other, an adjustable throttle means being arranged in the connecting line means, at least three pair of throttle resistor means being provided, one throttle resistor means of each pair of the throttle resistor means being arranged in the measured-value input line means, and the second throttle means of each pair of throttle resistor means being arranged in the desired-value input line means, each throttle resistor means of each pair of throttle resistor means having an identical resistance value, the connecting line means being arranged between the first pair of throttle resistor means and the second pair of throttle resistor means and the differential amplifier means being arranged between the second pair of throttle resistor means and the third pair of throttle resistor means.

2. A circuit for pneumatic controllers, the circuit comprising a measured-value input line means, a desired-value input line means, at least one differential amplifier means having input pressure chambers adapted to be exposed to pressures in the respective measured-value and desired value input line means, a line means being provided for connecting the input line means to each other, an adjustable throttle means being arranged in the connecting line means, at least three pair of throttle resistor means being provided, one throttle resistor means of each pair of throttle resistor means being arranged in the measured-value input line means and the second throttle means of each pair of throttle resistor means being arranged in the desired-value input line means, each throttle resistor means of each pair of throttle resistor means having an identical resistance value, the differential amplifier means being arranged between the first pair of throttle resistor means and the second pair of throttle resistor means, and the connecting line means and adjustable throttle means being connected between the second pair of throttle resistor means and the third pair of throttle resistor means.

3. The circuit according to claim 1 or 2, wherein the differential amplifier means includes elastic wall means for defining the input pressure chambers.

4. The circuit according to claim 3, wherein the throttle resistor means each being constructed as glass capillaries.

5. The circuit according to claim 4, wherein the pneumatic controller having an adjustable proportional-action range.

6. The circuit according to claims 1 or 2, wherein the throttle resistor means being fashioned as glass capillaries.

* * * * *